(12) United States Patent
Wang et al.

(10) Patent No.: US 8,213,090 B2
(45) Date of Patent: Jul. 3, 2012

(54) ELECTROWETTING PIXEL STRUCTURE

(75) Inventors: Chih-Yuan Wang, Tai Chung County (TW); Hsi-Rong Han, Tai Chung County (TW); Chien-Ting Chan, Chang Hua County (TW); Wan-Jen Tsai, Tai Chung County (TW); Wei-Yuan Cheng, Taipei County (TW); Kuo-Lung Lo, Taipei County (TW)

(73) Assignees: Wintek Corporation, Taichung (TW); Industrial Technology Research Institute, Hsinchu (TW)

( * ) Notice: Subject to any disclaimer, the term of this patent is extended or adjusted under 35 U.S.C. 154(b) by 84 days.

(21) Appl. No.: 12/875,769

(22) Filed: Sep. 3, 2010

(65) Prior Publication Data

US 2011/0058245 A1    Mar. 10, 2011

(30) Foreign Application Priority Data

Sep. 4, 2009    (TW) ............................. 98129794 A
Jul. 28, 2010    (TW) ............................. 99124849 A (51) Int. Cl.
*G02B 1/06* (2006.01)
(52) U.S. Cl. ....................................... 359/665; 359/666
(58) Field of Classification Search ............. 359/665, 359/666
See application file for complete search history.

(56) References Cited

U.S. PATENT DOCUMENTS

2007/0127108 A1    6/2007    Hayes et al.
2009/0316253 A1*  12/2009    Fairley et al. ................. 359/292

* cited by examiner

*Primary Examiner* — William Choi
(74) *Attorney, Agent, or Firm* — Muncy, Geissler, Olds & Lowe, PLLC (57) ABSTRACT

An electrowetting pixel structure includes a substrate, a hydrophobic dielectric layer, a non-polar liquid, a polar liquid, at least one electrode, and at least one contact hole. The hydrophobic dielectric layer is formed on the substrate, the non-polar liquid covers one surface of the hydrophobic dielectric layer, and the polar liquid is provided on the hydrophobic dielectric layer where the non-polar liquid and the polar liquid are immiscible. The electrode is formed on the substrate and divides the substrate into an electrode section and a non-electrode section. When a voltage is applied to the electrowetting pixel structure, the non-polar liquid contracts on the hydrophobic dielectric layer and is confined to an area substantially overlapping the non-electrode section. The contact hole is formed on the substrate at a position away from the non-electrode section of the electrowetting pixel structure.

15 Claims, 8 Drawing Sheets

ELECTROWETTING PIXEL STRUCTURE

BACKGROUND OF THE INVENTION (a) Field of the Invention

The invention relates to an electrowetting pixel structure.

(b) Description of the Related Art

Figure 1A:
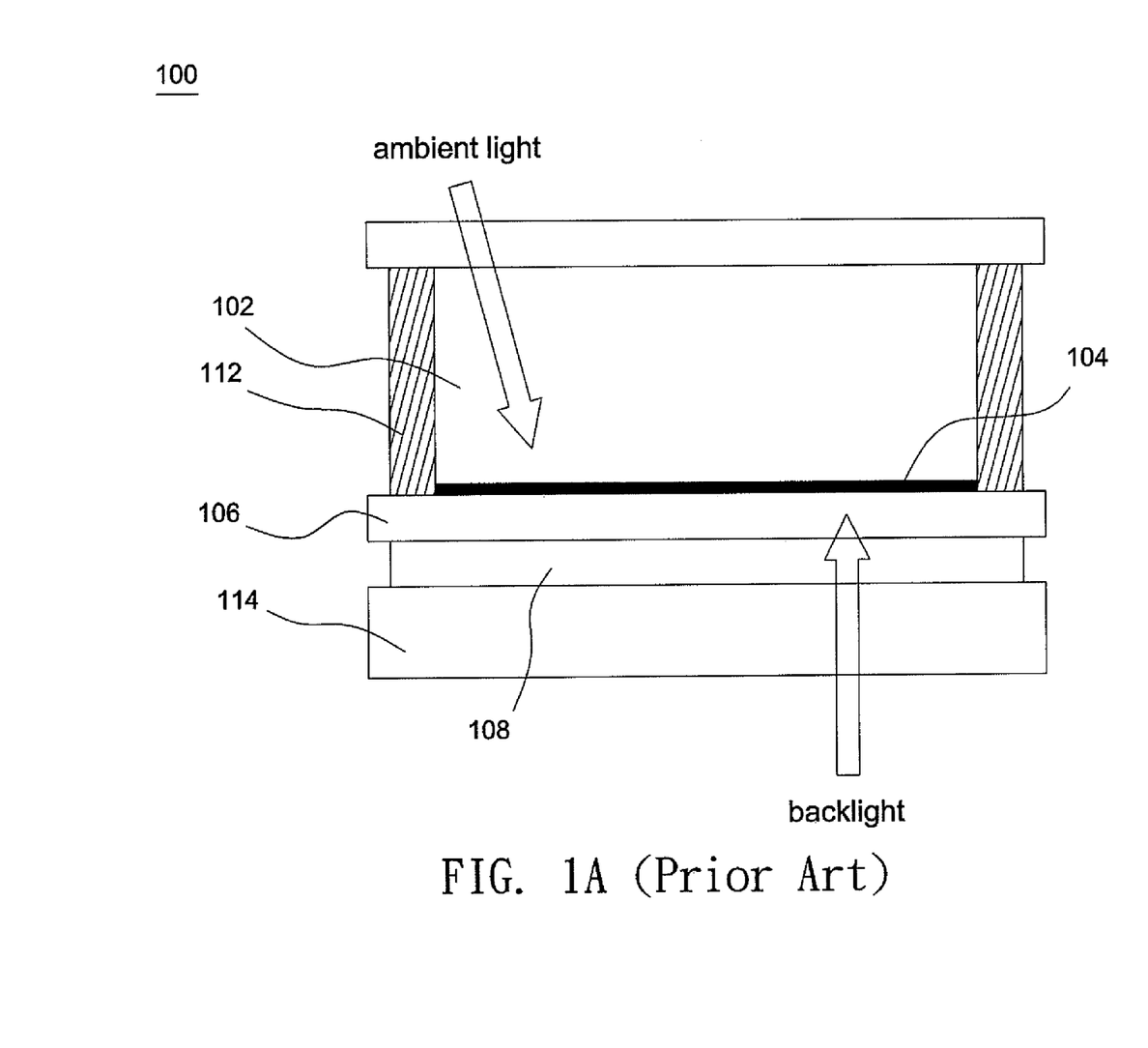
FIGS. 1A and 1B show schematic diagrams illustrating a conventional electrowetting pixel structure.
Figure 1B:
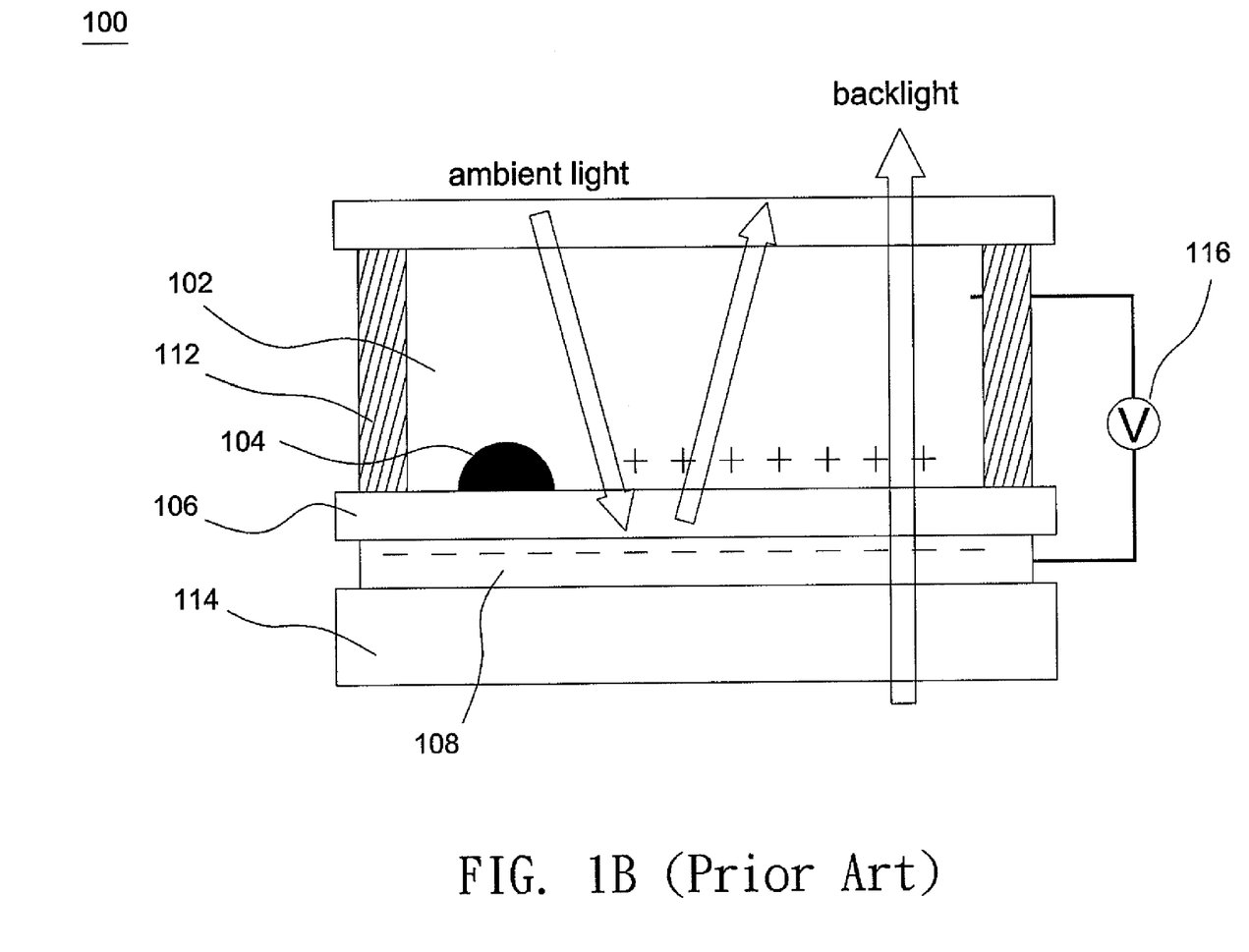
Figure 1C:
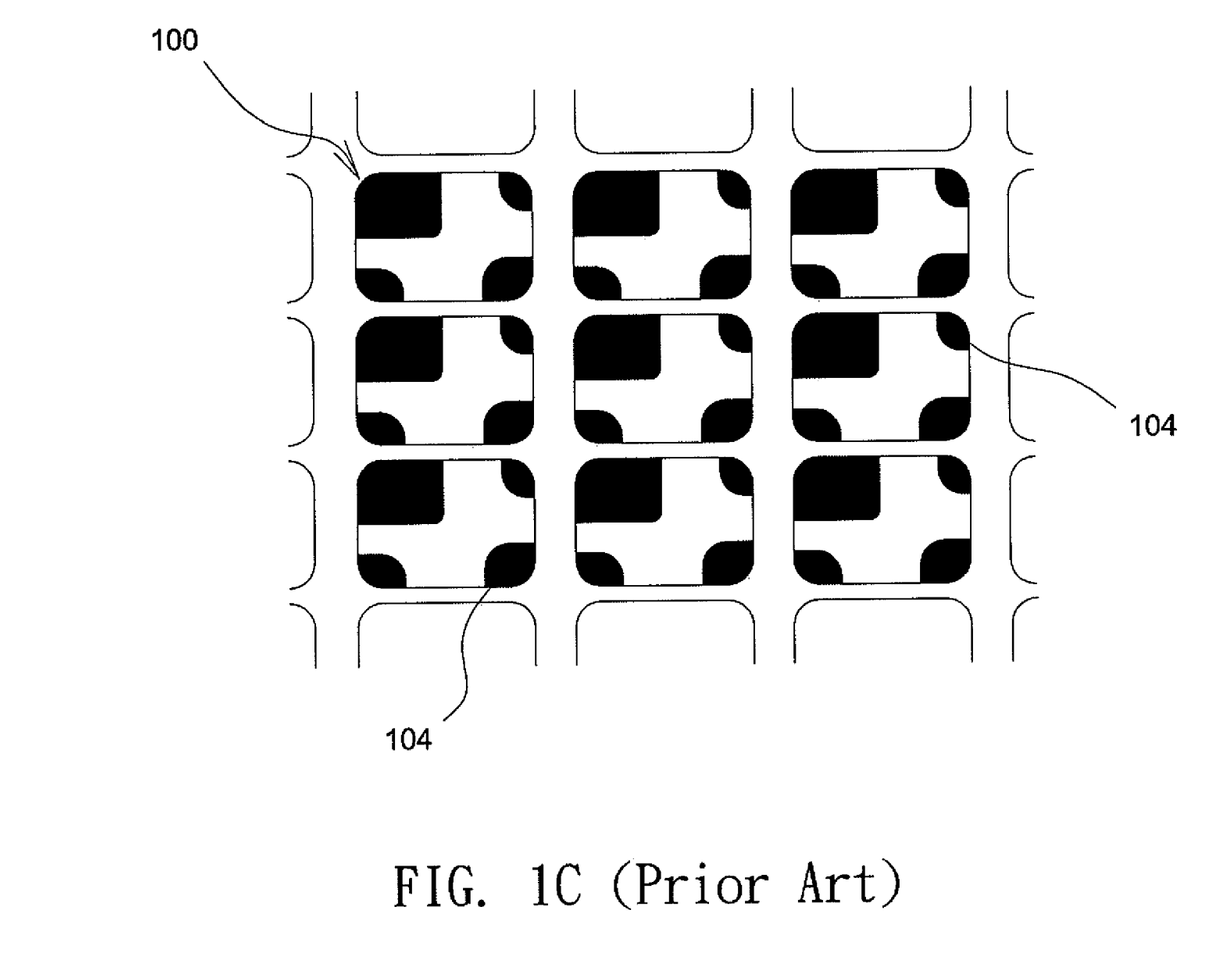
FIG. 1C shows a schematic diagram illustrating the delay of ink contraction.

FIG. 1A and FIG. 1B show cross-sectional schematic diagrams illustrating a display unit 100 of a conventional electrowetting display. As shown in FIG. 1A and FIG. 1B, the display unit 100 includes a polar liquid 102, a black ink 104, and a hydrophobic dielectric layer 106. As shown in FIG. 1A, when no voltage is applied, the black ink 104 evenly covers an upper surface of the hydrophobic dielectric layer 106 and thus ambient light or a backlight is absorbed to show a dark state. On the contrary, as shown in FIG. 1B, when a voltage supplied by a voltage source 116 is applied to a transparent electrode 108, an interface between the hydrophobic dielectric layer 106 and the aqueous solution 102 is polarized to increase surface energy. In that case, the hydrophobic dielectric layer 106 becomes less hydrophobic to push the black ink 104 aside to the rib 112. At this time, ambient light is allowed to be reflected by the bottom substrate 114 or the backlight is allowed to pass through the bottom substrate 114 to form a bright state. Such design uses a transparent electrode (such as an indium tin oxide electrode) spreading on an entire surface to drive the black ink 104, and the to spread over the whole surface but, when the black ink 104. Hence, as the black ink 104 contracts on the hydrophobic dielectric layer 106, a delay in ink contraction often occurs and the black ink 104 tends to stay at a corner or an edge of each pixel, as shown in FIG. 1C. This results in a considerable decrease in the display quality and the response speed of an electrowetting display.

BRIEF SUMMARY OF THE INVENTION

In light of the above-mentioned problem, one object of the invention is to provide an electrowetting pixel structure where a non-polar liquid has a reduced delay in contraction to avoid residue left on the edge of the electrowetting pixel structure, and the electrowetting pixel structure has excellent display quality and response speed.

Other objects and advantages of the invention can be better understood from the technical characteristics disclosed by the invention.

According to the design of one embodiment of the invention, an electrowetting pixel structure includes a substrate, a hydrophobic dielectric layer, a non-polar liquid, a polar liquid, at least one electrode, and at least one contact hole. The hydrophobic dielectric layer is formed on the substrate, and the non-polar liquid covers one surface of the hydrophobic dielectric layer. The polar liquid is provided on the hydrophobic dielectric layer where the non-polar liquid and the polar liquid are immiscible. The electrode is formed on the substrate and divides the substrate into an electrode section and a non-electrode section. When a voltage is applied to the electrowetting pixel structure, the non-polar liquid contracts on the hydrophobic dielectric layer and is confined to an area substantially overlapping the non-electrode section. The contact hole is formed on the substrate at a position away from the non-electrode section of the electrowetting pixel structure.

In one embodiment, the non-electrode section is formed on one corner portion of the electrowetting pixel structure and the contact hole is formed on at least one of the other corner portions of the electrowetting pixel structure.

In one embodiment, the electrowetting pixel structure has at least a first, a second, a third, and a fourth sides, the non-electrode section is near the first and the second sides, and the contact hole is formed on the third side or the fourth side.

In one embodiment, the number of contact holes is more than one and each of the contact holes of the electrowetting pixel structure has at least two different depths or sizes.

According to another embodiment of the invention, an electrowetting pixel structure includes a substrate, a hydrophobic dielectric layer, a non-polar liquid, a polar liquid, and at least one contact hole. The hydrophobic dielectric layer is formed on the substrate. The polar liquid is provided on the hydrophobic dielectric layer. The non-polar liquid covers one surface of the hydrophobic dielectric layer and the non-polar liquid and the polar liquid are immiscible. When a voltage is applied to the electrowetting pixel structure, the non-polar liquid contracts from at least one side of the hydrophobic dielectric layer and is confined to a preset local area of the hydrophobic dielectric layer. The contact hole is formed on the substrate and overlaps the side of the hydrophobic dielectric layer.

According to the above embodiments, the contact hole is the earliest one in the structure to sense the electric field. By such a characteristic, since the ink is pushed aside from the earliest conducting position by the electric field, the via hole can be formed on the electrowetting pixel structure at a position away from the non-electrode section so as to increase the contraction speed of the ink and hence avoid the ink remaining at the edge or corner of the electrowetting pixel structure. In addition, by arranging contact holes with different depths or sizes, the contraction speed of non-polar liquid in different areas can be adjusted to thereby achieve uniform contraction of non-polar liquid.

Other objects and advantages of the invention can be better understood from the technical characteristics disclosed by the invention. In order to clarify the above mentioned and other objects and advantages of the invention, examples accompanying with figures are provided and described in details in the following.

DETAILED DESCRIPTION OF THE INVENTION

The above and other technical content, characteristics, and functions of the invention will be described in details with reference to the drawings. For clarity, the wording related to direction, such as up, down, left, right, front, back, etc., used in examples is referred to the direction in drawings. Therefore, the wording related to direction is not used to limit the scope of the invention.

Figure 2:
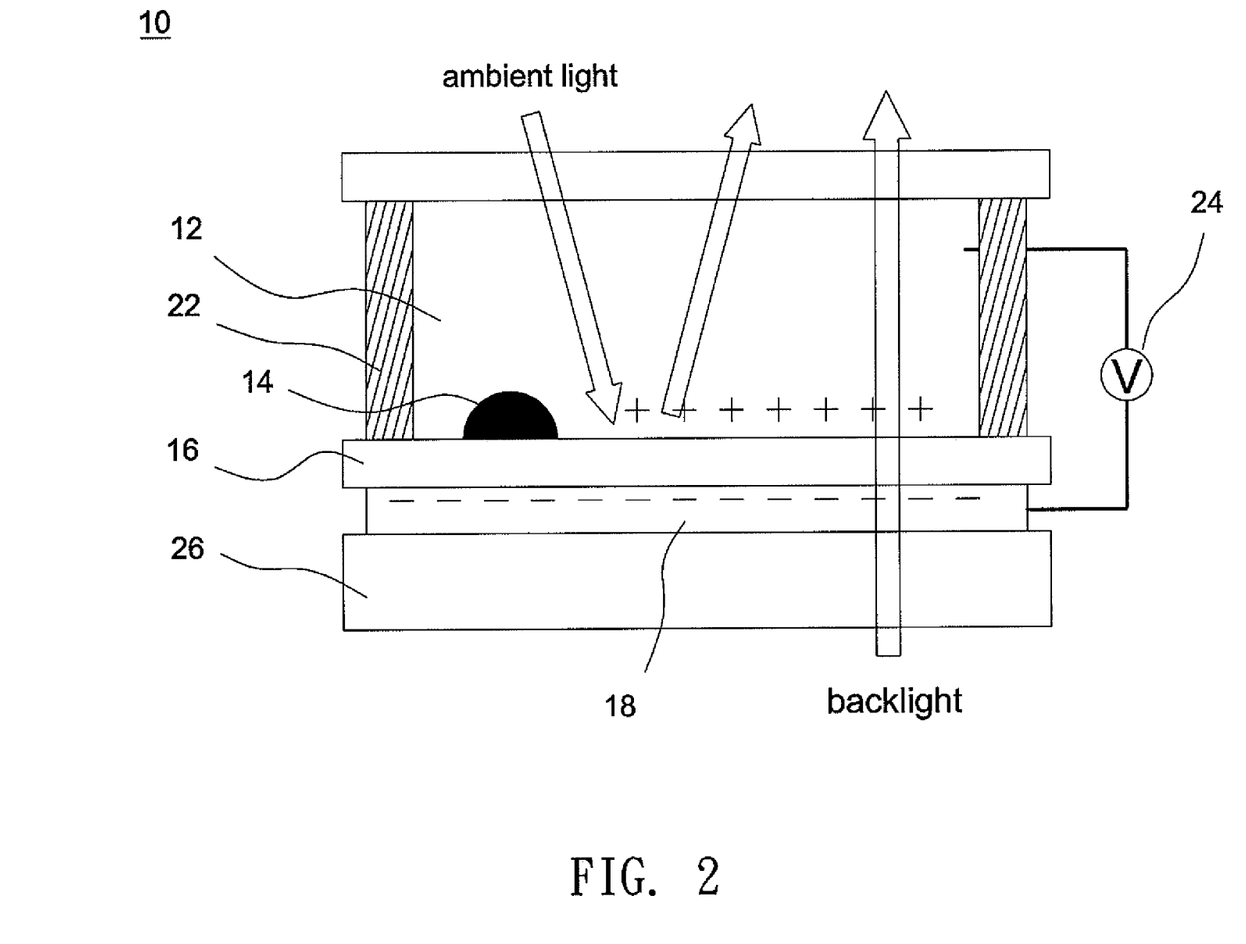
FIG. 2 shows a cross-sectional schematic diagram illustrating an electrowetting pixel structure according to an embodiment of the invention.
Figure 3:
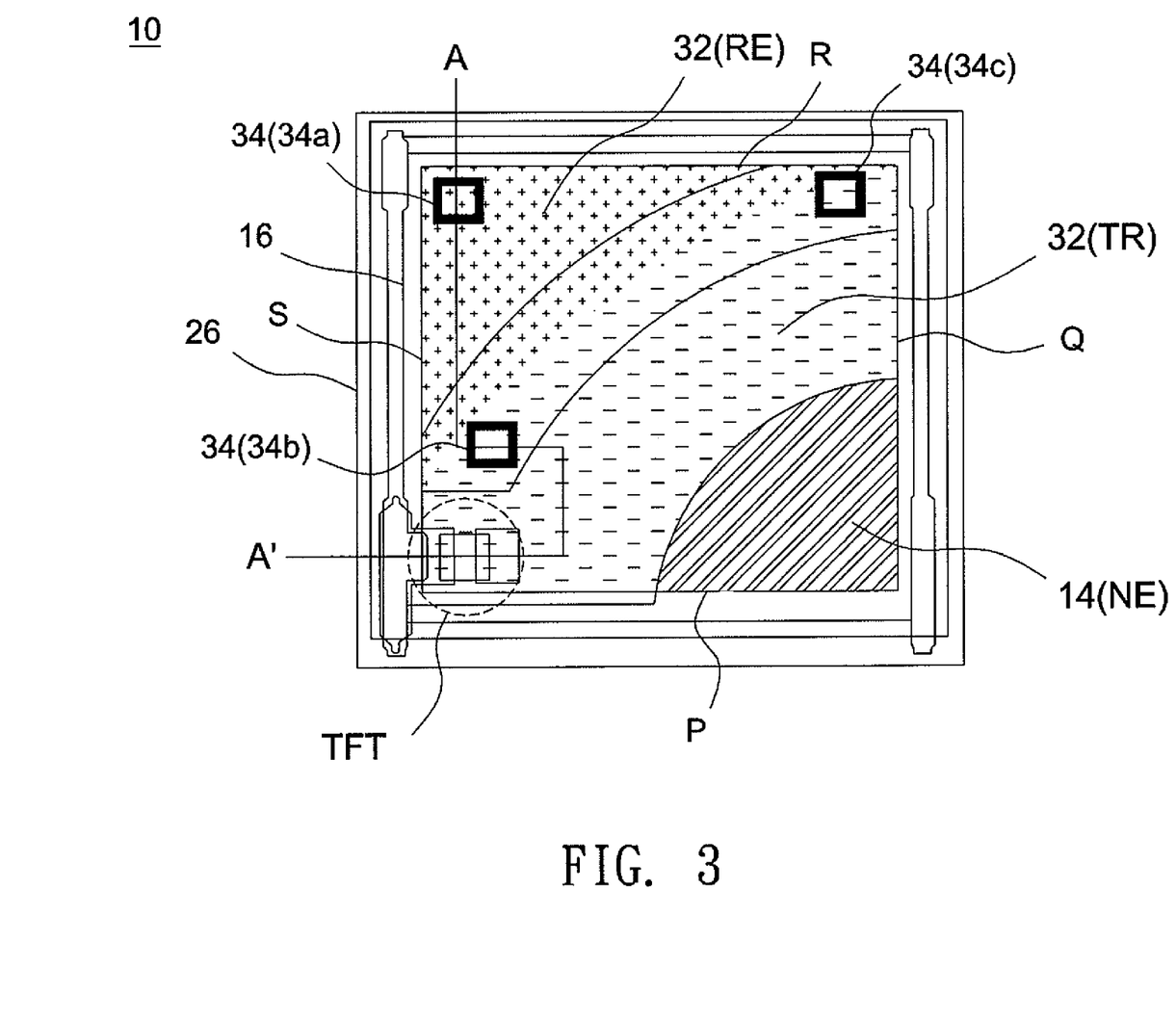
FIG. 3 shows a schematic diagram illustrating the layout of an electrowetting pixel structure according to an embodiment of the invention.
Figure 4:
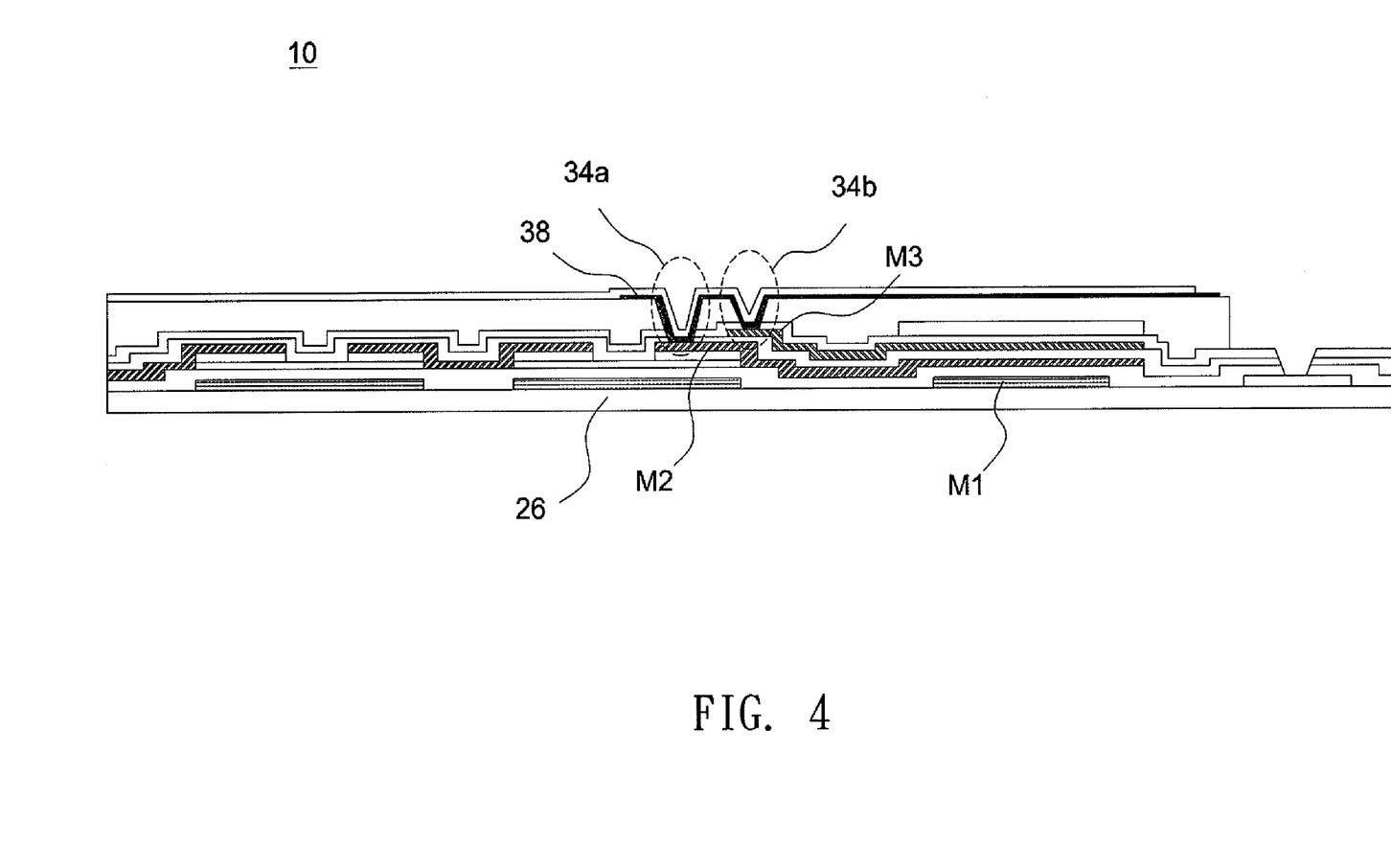
FIG. 4 shows a cross-sectional schematic diagram cut along line A-A' in FIG. 3.

FIG. 2 shows a cross-sectional schematic diagram illustrating an electrowetting pixel structure according to an embodiment of the invention. As shown in FIG. 2, the electrowetting pixel structure 10 includes a polar liquid 12, a non-polar liquid such as ink 14, and a hydrophobic dielectric layer 16. The ink 14 and the polar liquid 12 are immiscible. When no voltage is applied, the ink 14 evenly covers an upper surface of the hydrophobic dielectric layer 16 and thus ambient light or backlight is absorbed to show a dark state. When a voltage supplied by a voltage source 24 is applied to the transparent electrode 18, an interface between the hydrophobic dielectric layer 16 and the liquid 12 is polarized to increase surface energy, so that the hydrophobic dielectric layer 16 becomes less hydrophobic to push the ink 14 aside to the rib 22. At this time, ambient light is allowed to be reflected by the substrate 26 or the backlight is allowed to pass through the substrate 26 to form a bright state. FIG. 3 shows a schematic diagram illustrating the layout of an electrowetting pixel structure according to an embodiment of the invention. FIG. 4 shows a cross-sectional schematic diagram cut along line A-A' in FIG. 3. As shown in FIG. 3, an electrode layer 32 is formed on part of the substrate 26 to divide the substrate 26 into an electrode section where the electrode layer 32 spreads and a non-electrode section NE. In this embodiment, the electrode layer 32 includes a reflective electrode RE and a transparent electrode TR. Note the reflective electrode RE may constitute a reflective area and the transparent electrode TR may constitute a transmissive area of the electrowetting pixel structure 10. Also, the formation of the reflective area is not limited. In alternate embodiment, a transparent electrode formed on a reflective plate similarly constitutes a reflective area. When a voltage is applied to the electrowetting pixel structure 10, the ink 14 contracts on the hydrophobic dielectric layer 16 and is thereby confined to an area substantially overlapping the non-electrode section NE. In other words, the non-electrode section NE at the lower right corner of FIG. 3 is treated as an existent area of the ink 14 after contraction. Preferably, the ink 14 completely contracts to the non-electrode section NE and does not remain at any edge or corner of the electrowetting pixel structure 10. Further, the contact hole 34 is the first one in the structures to sense the electric field; that is, when the pixel electrode is driven (not shown), the first position to sense the electric field on the pixel electrode is the contact hole 34. By such a characteristic, since the ink 14 is pushed aside from the earliest conducting position by the electric field, the via hole 34 can be formed on the electrowetting pixel structure 10 at a position away from the non-electrode section NE so as to increase the contraction speed of the ink 14 and hence avoid the ink 14 remaining at the edge or corner of the electrowetting pixel structure 10, as shown in FIG. 1C. For example, as shown in FIG. 3, when the non-electrode section NE is formed at the lower right corner of FIG. 3, a contact hole 34a is formed at the upper left corner (opposite the lower right corner) of FIG. 3, and a contact hole 34c is formed at the upper right corner of FIG. 3, with the position of these contact holes 34a and 34c being comparatively far from the non-electrode section NE. Thus, the ink 14 at the upper left corner and the upper right corner quickly contracts and moves to the non-electrode section NE because of the sensing characteristic of the contact hole 34. As a result, the ink 14 does not remain at the corner. Alternatively, as shown in FIG. 3, for example, in case the non-electrode section NE is near the side P and the side Q of the electrowetting pixel structure 10, the contact hole 34 may be formed on the side R (such as contact holes 34a, 34c) or the side S (such as contact holes 34a, 34b), with the position of these contact holes 34a, 34b and 34c being also comparatively far from the non-electrode section NE. Obviously, the number of contact holes 34 is not limited, as long as the contact holes 34 are positioned away from the non-electrode section NE.

Besides, according to this embodiment, the thin film transistor fabricating process using photolithography can be used to form a plurality of contact holes 34 on the substrate 26, where the contact holes 34 in each electrowetting pixel structure 10 may have at least two different depths. For example, as shown in FIG. 4, the depth of the contact hole 34a is larger than that of the contact hole 34b. A first metal layer M1, a second metal layer M2, and a third metal layer M3 separate from each other by an insulating layer are sequentially formed on the substrate 26. Since the deeper contact hole 34a is connected to the transparent pixel electrode 38 through the second metal layer M2, the contact hole 34a is the first position to sense the electric field when a voltage is applied to the electrowetting pixel structure 10. In comparison, the shallower contact hole 34b is connected to the transparent pixel electrode 38 through the third metal layer M3, the contact hole 34b is the second position to sense the electric field. Since the ink 14 is pushed aside at a position where the electric field is conducted, the different depths of contact holes that cause different conduction speeds of electric field may be used to adjust the contraction speed of ink at different positions to achieve uniform contraction of ink. For example, since the contact hole 34a has a deeper structure and the contact hole 34b has a shallower structure, the contact hole 34a away from the non-electrode section NE at a comparatively long distance is conducted first, and the contact hole 34b away from the non-electrode section NE at a comparatively short distance is conducted next to achieve uniform contraction of ink 14. Besides, the use of different depths of contact holes may effectively increase the pixel aperture ratio. In addition, the contact holes 34 in each electrowetting pixel structure 10 may have at least two sizes, where a contact hole 34 with a larger diameter may induce greater electric fields to speed ink contraction. Hence, by allocating the contact holes with different sizes, the contraction speed of the ink at different positions can be adjusted to achieve uniform contraction of ink 14. Further, in one embodiment, the contact hole 34 is filled with a conductive substance or a non-conductive substance, and the hydrophobic dielectric layer 16 is provided on the substrate after the contact hole 34 is filled up. This may eliminate an abnormal stack of ink 14 on the contact hole 34.

Figure 5:
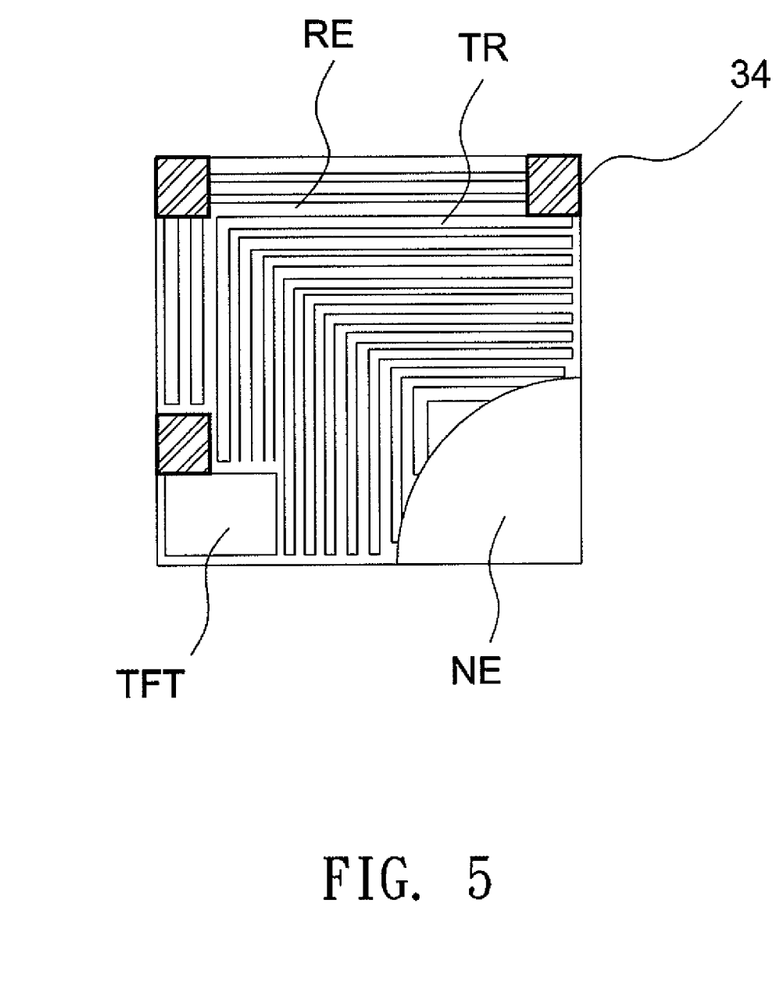
FIG. 5 shows a schematic diagram illustrating an electrowetting pixel structure according to another embodiment of the invention.
Figure 6:
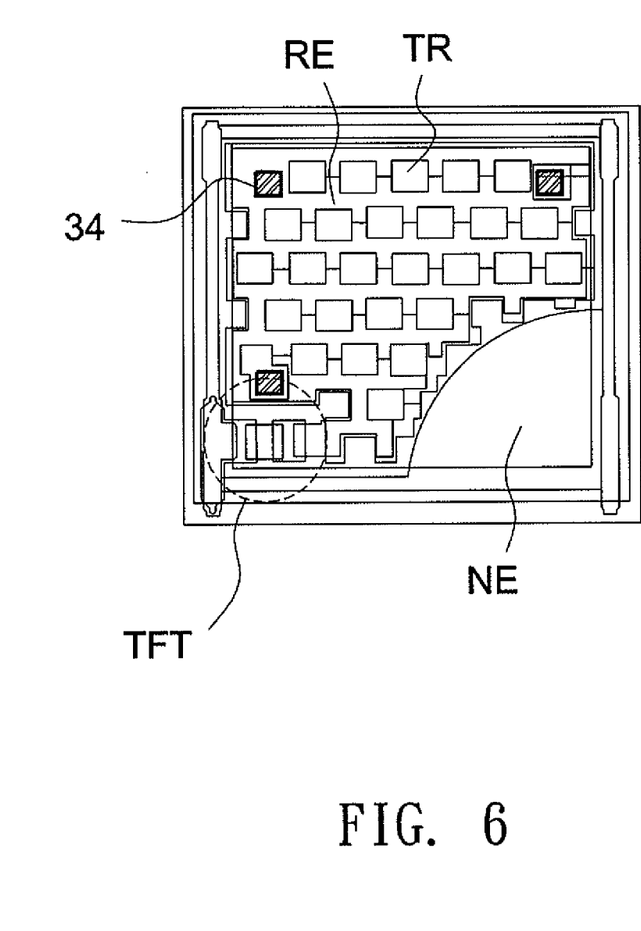
FIG. 6 shows a schematic diagram illustrating an electrowetting pixel structure according to another embodiment of the invention.

Moreover, in the above embodiment, the distribution of the reflective electrode RE and the transparent electrode TR is not limited. For example, as shown in FIG. 3, the reflective electrode RE and the transparent electrode TR are arranged to form a block pattern. Also, as shown in FIG. 5, the reflective electrode RE and the transparent electrode TR are alternately arranged to form a comb-like pattern. Besides, as shown in FIG. 6, the reflective electrode RE and the transparent electrode TR together form a chessboard-shaped pattern.

Figure 7:
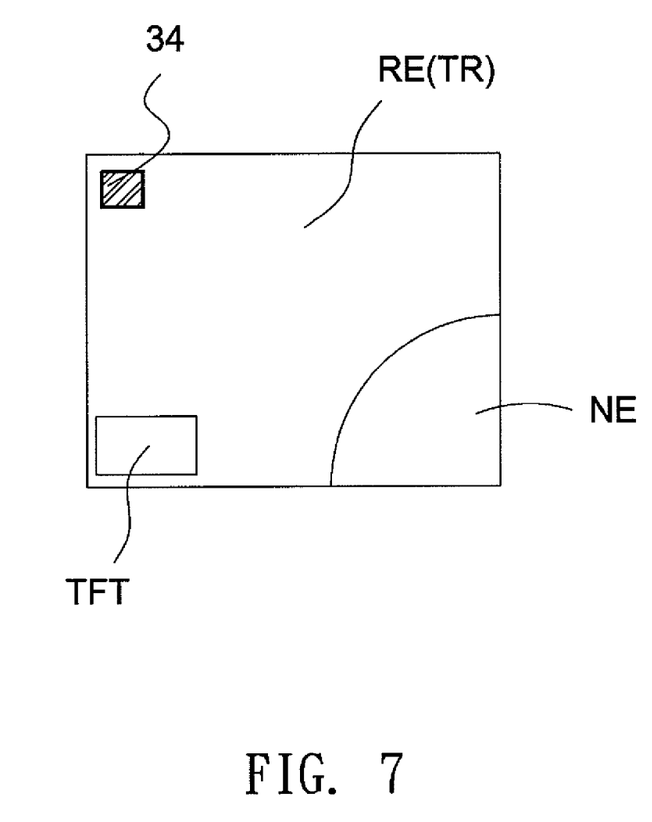
FIG. 7 shows a schematic diagram illustrating an electrowetting pixel structure according to another embodiment of the invention.
Figure 8:
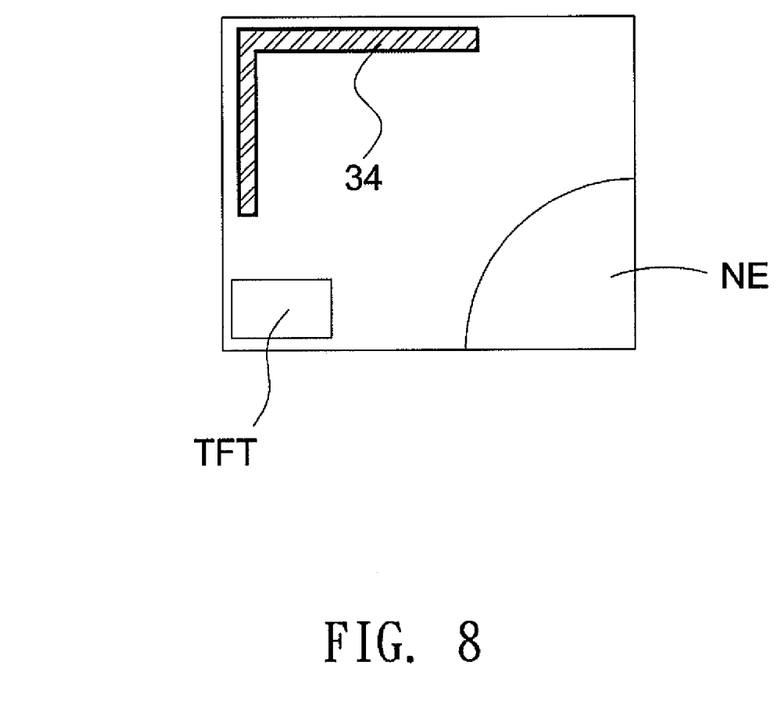
FIG. 8 shows a schematic diagram illustrating an electrowetting pixel structure according to another embodiment of the invention.

Though the above embodiment shows a transflective pixel structure, this is not limited. As shown in FIG. 7, each embodiment of the invention can be applied to a transmissive pixel structure including only transparent electrodes TR or a reflective pixel structure including only reflective electrodes RE. The size, shape, and distribution of contact holes are not limited at all. For example, as shown in FIG. 8, the contact hole 34 may extend to spread on two sides of a pixel structure. Furthermore, the non-polar liquid like ink 14 is not limited to be confined to the non-electrode section NE. When a voltage is applied to the electrowetting pixel structure 10, the non-polar liquid may contract from one side of the hydrophobic dielectric layer 16 to a preset local area of the hydrophobic dielectric layer 16, with the contact hole being formed on the substrate at a position overlapping the side of the hydrophobic dielectric layer. Thus, the contraction speed of the non-polar liquid is effectively accelerated and the delay in the contraction of the non-polar liquid is reduced to thereby increase display quality and response speed.

Although the present invention has been fully described by the above embodiments, the embodiments should not constitute the limitation of the scope of the invention. Various modifications or changes can be made by those who are skilled in the art without deviating from the spirit of the invention. Any embodiment or claim of the present invention does not need to reach all the disclosed objects, advantages, and uniqueness of the invention. Besides, the abstract and the title are only used for assisting the search of the patent documentation and should not be construed as any limitation on the implementation range of the invention.

What is claimed is:

1. An electrowetting pixel structure, comprising:
   a substrate;
   a hydrophobic dielectric layer, formed on the substrate;
   a non-polar liquid covering one surface of the hydrophobic dielectric layer;
   a polar liquid provided on the hydrophobic dielectric layer, wherein the non-polar liquid and the polar liquid are immiscible;
   at least one electrode formed on the substrate to divide the substrate into an electrode section and a non-electrode section, wherein, when a voltage is applied to the electrowetting pixel structure, the non-polar liquid contracts on the hydrophobic dielectric layer and is confined to an area substantially overlapping the non-electrode section; and
   at least one contact hole formed on the substrate at a position away from the non-electrode section of the electrowetting pixel structure.

2. The electrowetting pixel structure according to claim 1, wherein the contact hole is formed on the substrate at a position opposite the non-electrode section of the electrowetting pixel structure.

3. The electrowetting pixel structure according to claim 1, wherein the non-electrode section is formed on one corner portion of the electrowetting pixel structure and the contact hole is formed on at least one of the other corner portions of the electrowetting pixel structure.

4. The electrowetting pixel structure according to claim 1, wherein the electrowetting pixel structure has at least a first, a second, a third and a fourth sides, the non-electrode section is near the first and the second sides, and the contact hole is formed on the third side or the fourth side.

5. The electrowetting pixel structure according to claim 1, wherein the electrode section comprises at least one reflective electrode and at least one transparent electrode.

6. The electrowetting pixel structure according to claim 1, wherein the non-polar liquid comprises ink.

7. The electrowetting pixel structure according to claim 1, wherein the number of contact holes is more than one, and the contact holes of the electrowetting pixel structure have at least two different depths.

8. The electrowetting pixel structure according to claim 1, wherein the number of contact holes is more than one, and the contact holes of the electrowetting pixel structure have at least two different sizes.

9. An electrowetting pixel structure, comprising:
   a substrate;
   a hydrophobic dielectric layer formed on the substrate;
   a polar liquid provided on the hydrophobic dielectric layer;
   a non-polar liquid covering one surface of the hydrophobic dielectric layer, wherein the non-polar liquid and the polar liquid are immiscible and, when a voltage is applied to the electrowetting pixel structure, the non-polar liquid contracts from at least one side of the hydrophobic dielectric layer and is confined to a preset local area of the hydrophobic dielectric layer; and
   at least one contact hole formed on the substrate and overlapping the at least one side of the hydrophobic dielectric layer.

10. The electrowetting pixel structure according to claim 9, further comprising:
    at least one electrode substantially formed on the substrate at a position not overlapping the preset local area of the hydrophobic dielectric layer.

11. The electrowetting pixel structure according to claim 9, further comprising:
    at least one reflective area and at least one transmissive area substantially formed on the substrate at a position not overlapping the preset local area of the hydrophobic dielectric layer.

12. The electrowetting pixel structure according to claim 9, wherein the non-polar liquid comprises ink.

13. The electrowetting pixel structure according to claim 9, wherein the number of contact holes is more than one, and the contact holes of the electrowetting pixel structure have at least two different depths.

14. The electrowetting pixel structure according to claim 9, wherein the number of contact holes is more than one, and the contact holes of the electrowetting pixel structure have at least two different sizes.

15. The electrowetting pixel structure according to claim 9, wherein the contact hole is filled with a conductive substance or a non-conductive substance.

* * * * *